L. F. KENNEY.
SPRING TIRE.
APPLICATION FILED MAR. 19, 1909.

949,903.

Patented Feb. 22, 1910.

Inventor
Leonard F. Kenney.

Witnesses

By

Attorney

UNITED STATES PATENT OFFICE.

LEONARD F. KENNEY, OF AVONDALE, ALABAMA, ASSIGNOR OF ONE-THIRD TO
O. E. HEATH.

SPRING-TIRE.

949,903.   Specification of Letters Patent.   Patented Feb. 22, 1910.

Application filed March 19, 1909. Serial No. 484,579.

*To all whom it may concern:*

Be it known that I, LEONARD F. KENNEY, a citizen of the United States, residing at Avondale, in the county of Jefferson and State of Alabama, have invented new and useful Improvements in Spring-Tires, of which the following is a specification.

My invention relates to an improvement in cushioned tires for vehicle wheels, its object being to provide a tire for automobiles, vehicles, bicycles, and like machines which shall possess all of the resiliency of the pneumatic tire, while being free from its disadvantages which is its tendency to puncture, high initial cost, and comparatively short life.

More particularly it is my object to provide a spring supported cushion tire comprising important advantages in the manner in which the tire sections are assembled and protected from the entrance of dust and dirt, and also in the means by which the outer tire is effectively but not positively held to its work by the springs, a rigid connection destroying the ability of the outer rim, as a whole, to yield and function as desired.

My invention further comprises the details of construction and arrangement of parts hereinafter more particularly described and claimed, reference being had to the accompanying drawings, in which:—

Figure 1:
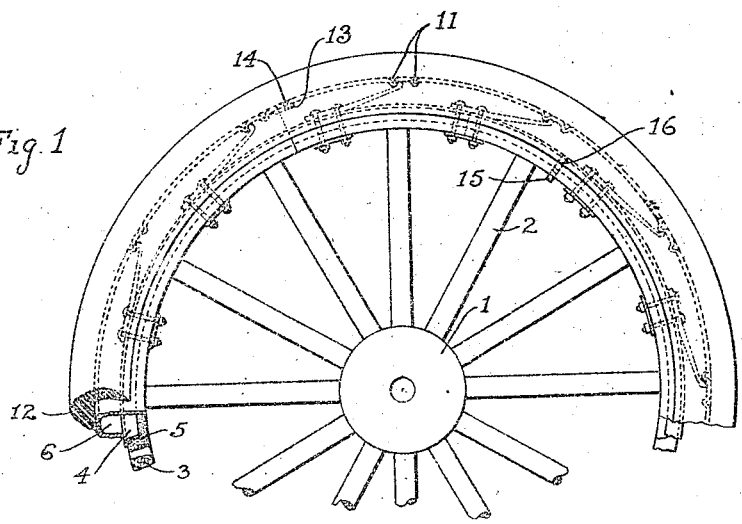
Figure 2:
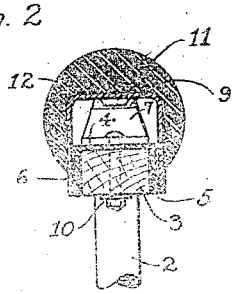
Figure 3:
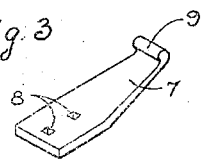
Figure 4:
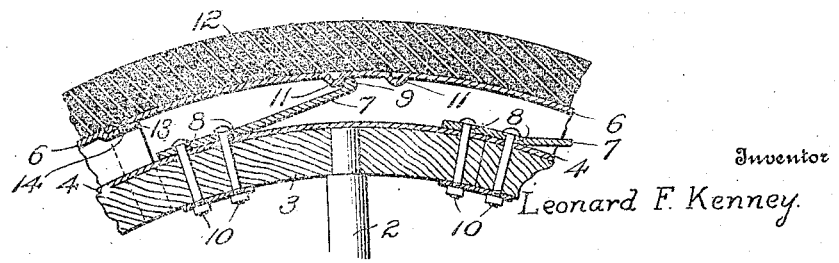

Figure 1 presents a partial side elevation of a wheel provided with my improved cushioned tire. Fig. 2 is a cross sectional view of Fig. 1. Fig. 3 is a detail view of one of the springs. Fig. 4 is an enlarged longitudinal sectional view through a portion of the rim.

Similar reference numerals refer to similar parts throughout the drawings.

The wheel, which is formally illustrated, comprises a hub 1, spokes 2, and wooden felly 3, all of which may be of any standard construction. Over the outer periphery of the felly I fit a annular U-shaped metal rim 4, the side walls of which flare out slightly from the parallel sides of the felly to provide for the reception of felt packing rings 5, the felt being held in place between the sides of the rim 4 and the felly and projecting below the former so as to securely pack against the entrance of dirt between the rim 4 and the outer tire. This tire comprises an outer rim 6, which is U-shaped in cross section, the side walls of which are substantially parallel and make a sliding joint with the lower edges of the rim 4 and the felt packing 5. Normally the outer rim 6 stands with its lower edges on a level with the underface of the felly, leaving an annular clearance between its outer periphery and the rim 4 in which the supporting springs 7 for the outer rim are disposed. These springs, as seen in Fig. 3, are flat springs provided with bolt openings 8 and having the outer ends bent upwardly at an angle and rounded at 9. Bolts 10 secure the springs in place, passing through the spring, the rim 4 and the felly, thereby serving to secure both the springs and the rim 4 firmly in place. In my preferred construction I provide one spring for use between each pair of spokes, the fastening bolts 10 passing through the felly at a point equi-distant from the two adjacent spokes. The inner rim 6 is indented or otherwise upset to form pairs of inwardly disposed shoulders 11, which are arranged in pairs and so disposed that the rounded end 9 of each spring will engage the rim 6 between a pair of these shoulders. The shoulders are spaced farther apart than the radial distance between the bolts 10 and the rim 6 to prevent the weight falling on the springs at the side as the outer case moves responsive to the yielding of the lower springs at the time supporting the weight of the car. They, however, effectively prevent the spring working past them when under pressure.

The outer rim 6 is covered by an elastic or other suitable tread portion 12, which is glued or otherwise secured thereon. The rim 6 has one end crimped or reduced as at 13 so as to telescope into the other end and be secured thereto by means of screws or rivets 14.

In operation, the springs 7 are designed so that about thirty per cent. of them, which at a time support the weight on the wheel, will be of sufficient strength to adequately support such weight and without assistance from the other springs. The outer rim 6 not being positively connected to the springs will yield and adjust itself according to conditions, the rounded ends 9 of the springs following and bearing against the outer rim and between the pairs of shoulders formed therein, thereby giving a positive but not rigid push and pull connection between the wheel and rim 6, which will meet all of the requirements in use. The felt packing effectively prevents the access of dirt and grit between the rims 4 and 6 and prevents the escape of lubricant introduced through an oil opening 15 normally closed by a plug 16. The sides of the inner rim are shown tapering from the inside of the channel. This gives an outer or bearing face parallel with the sides of the rim 6, which move in sliding contact therewith. The bearing surfaces of the rims are turned in a lathe or milled to give a smooth sliding bearing which is properly lubricated by the oil introduced between the rims. The slanting inner walls of the sides of rim 4 give a proper clearance for the channeling tool and, as stated, provide a recess for receiving the packing rings between the rim and the felly.

The detailed construction of the parts may be variously modified without departing from the principles of construction underlying my invention.

Having thus described my invention, what I claim as new and desire to secure by Letters Patent, is:—

1. A cushioned tire for wheels comprising in combination a wheel felly, an inner metal rim U-shaped in cross section and adapted to fit over the felly, flat springs connected to the outer periphery of said rim and having their free ends shouldered, an outer annular rim also substantially U-shaped in cross section which fits over said inner rim and engages the shouldered ends of the springs, and pairs of projections, carried by said outer rim, between pairs of which the shouldered ends of the springs are disposed, substantially as and for the purposes described.

2. A cushioned tire comprising in combination with a wheel felly, an inner metallic rim which fits over the felly and has sides which flare away slightly from the sides of the felly, packing rings inserted and held in place between said sides of the rim and felly, an outer substantially U-shaped annular rim which fits over said inner rim and works in engagement with said packing, flat springs bolted to the inner rim and having their outer ends rounded, and inwardly disposed projections formed in the outer rim which form bearing shoulders for engagement with the rounded ends of the springs, and an outer elastic tread secured to the outer rim, substantially as described.

3. A cushioned tire for vehicles comprising in combination an annular metallic rim, a non-metallic tread mounted thereon, pairs of inclined shoulders on said rim which project inwardly, an inner rim and supporting springs carried by said latter rim and having their free ends interposed between pairs of said shoulders, substantially as described.

In testimony whereof I have hereunto set my hand in presence of two subscribing witnesses.

LEONARD F. KENNEY.

Witnesses:
 FRANCIS WELSH,
 ANNIE L. PEACE.